United States Patent Office 3,110,691
Patented Nov. 12, 1963

1

3,110,691
METALLICALLY PIGMENTED LIQUID
COATING
John R. Fisher, Jr., Dayton, Ohio, assignor to Industrial
Metal Protectives, Inc., Dayton, Ohio, a corporation of
Delaware
No Drawing. Filed Dec. 11, 1958, Ser. No. 779,541
3 Claims. (Cl. 260—22)

This invention relates to liquid coating compositions and, more particularly, to metallically pigmented protective coatings or paints adapted to be prepared in ready mixed form and to provide, upon application to a surface to be protected, cathodic protection, corrosion resistance, and electrical conductivity.

In the fabrication or manufacture of many metallic structures or products, it may be desired to provide on the surfaces of the metallic parts a corrosion resistant coating, even prior to the fabrication of the parts into the finished structure. In many instances it may be found that the provision of such corrosion resistant coating by such conventional techniques as electroplating, galvanizing, etc., encounters some difficulties in application of the coating or use of the coated parts thereafter. If, on the other hand, it is attempted to provide such a corrosion resistant coating in the form of a metallic pigmented liquid coating or paint, other difficulties may be encountered in the use of such paint as, for example, the necessity for incorporating the metallic pigment into the vehicle, etc., of the paint and/or a reaction between the metallic pigment material and other components in the coating composition, which reaction may use up or waste a substantial portion of the metallic pigment or nullify the utility thereof for the desired corrosion resistance, cathodic protection, electrical conductivity (particularly in the event that the coated parts may later be welded or spot welded), etc.

Considering as illustrative paints or liquid coatings including a metallic pigment component comprising metallic zinc, if certain conventional vehicles and binders and driers are used in the preparation of such coating or paint, it may be necessary to react the metallic pigment with such vehicles, etc., for a substantial period of time so that all chemical reactions as between the metallic zinc and, for example, acidic components of the vehicles and driers are completed prior to application of the paint or coating. In addition to using up some of the metallic zinc otherwise desirably available for corrosion resistance, such processes may be unhandy, particularly at the point of application, and/or time consuming or otherwise undesirable or uneconomical. If, on the other hand, binders and vehicles, etc., are selected exclusively on the basis that they possess chemically reactive characteristics which do not undesirably involve reaction with a metallic zinc pigment component, some compromise or sacrifice may have to be made in the ultimately desired properties of the binders, vehicles, etc. Similarly, if it is attempted to avoid any of the aforementioned difficulties by some pretreatment of the metallic zinc pigment component itself to preclude reaction with the desired resin binders, vehicles, etc., not only may some added expense and extra operations be incorporated (such as, for example, separately packaging the metallic pigment component and

2 the binder and vehicle composition for admixture at the point of use instead of at the point of manufacture), but also some disadvantages may be experienced in connection with the continuous uniformity of metallic coating for corrosion resistance or cathodic protection as well as some disadvantages with regard to the overall electrical conductivity of the finished coating, as for welding purposes, and/or the likelihood of undesired gas formation at the coated surface upon corrosion or welding or further treatment thereof.

Thus, as will be understood, if it is desired to provide a ready mixed metallically pigmented paint or liquid coating to be packaged in a can or other sealed container for shipment, the various vehicles, binders, etc., are usually selected or treated so that prolonged reaction between such components and the metallic pigment component will not occur to produce in the sealed can an atmosphere or extra pressure of a gas such as hydrogen as might be produced as a resultant of a reaction between metallic zinc and acid radicals of a binder or vehicle component. As noted, however, if one were to attempt to select binder and vehicle components which are essentially non-reactive with a zinc pigment, the situation may arise where some desirable film-forming properties of such binders may have to be sacrificed or compromised to achieve the non-reactive condition, or where the electrical characteristics of the dried coating after application may be different than desired because of the characteristics of the non-reactive binders, or where certain objectionable or toxic conditions may obtain upon heat decomposition of the coating as in welding, etc.

Attempting to exhaust all the undesirable reactions between a metallic pigment and reactive binders, on the other hand, may result, as noted, in an excessively long blending or brewing time and/or in using up in undesired reactions a portion of the zinc pigment and/or in incorporating into the coating during a long (perhaps three or four days) reaction time an excessive amount and/or variable amounts of atmospheric moisture to produce either undesirably varying results in the finished material and/or an undesirably high proportion of zinc salts (instead of the desired metallic zinc) in the finished coating as applied.

According to this invention, however, a ready mixed metallic pigmented paint or liquid coating composition is provided in which a metallic pigment (for example, metallic zinc) is incorporated in a resin binder vehicle composition the components of which may be desirably chosen for their optimum binding or coating or film forming or conductive properties, and the composition prepared so that, not only may the zinc pigment be initially incorporated into the total composition in ready mixed form and prepackaged as desired, but also undesired reactions between the metallic pigment and the resin binders, etc., are avoided or controlled to the extent where substantially the entire quantity of metallic pigment in the composition is available in the finished coating for the desired corrosion resistance, cathodic protection, electrical conductivity, etc., properties or functions as coated and dried on the surface to be protected.

One object of this invention is to provide a ready mixed metallic pigmented coating composition or paint of the character described in which the metallic pigment component is incorporated in the composition as manufactured and without the necessity of separately shipping or mixing a pigment component at the point of use and in which substantially all of the metallic pigment component incorporated in the composition is available for corrosion resistance, cathodic protection, etc.

Another object of this invention is to provide a zinc pigmented and ready mixed coating composition or paint of the character described in which reaction between the zinc pigmented coating and various binder and resin components of the composition or paint vehicle are avoided to maintain substantially all the zinc pigment available for the desired coating or corrosion resistance or cathodic protection or electrical conductivity functions and notwithstanding the fact that the zinc pigment is incorporated into the coating composition at the point of manufacture and long prior to the actual time when the composition or paint is applied to a surface to be protected.

A further object of this invention is to provide a liquid coating composition or paint of the character described having resin binder and solvent and vehicle, etc., components which would normally react chemically with a metallic pigment admixed therewith, but which reactivity is controlled or avoided by pretreatment of the composition during manufacture so that substantially all of the metallic pigment admixed therewith will remain unreacted and available for protective coating formation as desired.

A further object of this invention is to provide a liquid coating composition or paint of the character described having resin binder and solvent and vehicle, etc., components which would normally react chemically with a metallic pigment admixed therewith, but which reactivity is controlled or avoided by pretreatment of the composition during manufacture so that substantially all of the metallic pigment admixed therewith will remain unreacted and available for protective coating formation as desired and which includes a component for absorbing atmospheric engendered reactants (such as moisture, etc.) which might coact with the metallic pigment and/or the resin binder components during storage to diminish the available metallic pigment content of the coating material.

Other objects and advantages of this invention will be apparent from the following description and the appended claims.

In the preparation of zinc based protective coating compositions or paints of the character to which this invention relates, even the utilization of more or less non-reactive binders or vehicles prepared from such materials as polystyrene, chlorinated rubber, Parlon, etc., have required a relatively long "brewing time" for the appropriate and effective incorporation of a metallic zinc pigment into the binders and vehicles. Similarly, even when the metallic zinc pigment has been pretreated to diminish the chemical reactivity thereof by any one of a number of different methods, still the presence of some acidic or like reactive components or radicals in the binders and vehicles and/or even the inevitable presence of moisture therein produces a condition which may cause interaction between the metallic pigment and binder or vehicle materials which may have a tendency undesirably to diminish the actual final metallic content available in the finished coating for the desired corrosion resistance, cathodic protection, electrical conductivity, etc., or produce dangerous gaseous resultants in the mixture, particularly in situations where the mixture of metallic pigment and resin binders is to be stored already mixed for substantial periods of time prior to use or, actually, during use and prior to application as a coating.

Particularly in situations where it is desired for the finally applied and dried coating material to have as high as practicable electrical conductivity through the metallic pigment (for example, to aid in welding or spot welding the coated parts without destruction of the protective coating in the area of the weld) or for galvanic protection of the coated surface, attempting to avoid some of the foregoing difficulties may result in a composition which includes resinous binder and vehicle components having a desired degree of electrical resistance, it being understood that the optimum characteristics of film forming binding, non-reaction with the metallic components, etc., may not necessarily inhere as chemical properties in particular synthetic binding or film forming compositions which also possess the desired, but unrelated, electrical properties of low resistance, etc.

According to this invention, however, an improved liquid coating composition or paint is provided by compounding resinous binder and vehicle components with the desired solvents, thinners, driers, etc., to achieve a composition of the desired ultimate electric characteristics (whether for welding the coated parts or from the standpoint of cathodic protection against corrosion), notwithstanding the fact that, conventionally, such a composition might be highly reactive with a metallic pigment component such as, for example, zinc dust. To this end, it may be advantageous to utilize such resin components as phenolics, epoxies, alkyds, iso-phthalic alkyds, and the like, which may have desirable electrical or finished coating properties, but which may be generally understood as being in a class of resin materials inimical to compounding with a metallic pigment such as zinc for the purposes of forming a coating material or paint of the character to which this invention relates.

After the formation of such binder or vehicle composition and to the desired consistency, a substantially anhydrous neutralizing component is added thereto (e.g., sodium or potassium hydroxide, basic metal oxides, etc.) to neutralize or otherwise render non-reactive acidic, etc., radicals or components which may be present in the resinous binder composition to effectively preclude later reaction thereof with an admixed metallic zinc pigment, and the moisture content or water content of the resulting mixture is further controlled by adding a moisture or water-absorbing material to dehydrate the binder or vehicle composition more or less completely prior to the addition thereto of a metallic pigment component, and, preferably, such water absorbing or moisture absorbing component is added in an excess amount sufficient to continue to absorb moisture and maintain the composition, including added metallic pigment, substantially moisture free after manufacture thereof and for a substantial period of storage, even when openly exposed to atmospheric moisture in use or while waiting for use.

Finally, after such preparation of the resin binder or vehicle composition, and, as will be understood, after such mixing or brewing or reaction time as may be required for the various aforementioned reactions to go to completion, the metallic pigment, such as zinc dust, is added to form the finished composition as a ready mixed liquid coating composition or paint which may be shipped, stored, and used as such without the necessity of mixing several components at the point of application and with an extended pot life and ease of application even with spray gun techniques, without wastage or using up the zinc pigment content by reaction with acid components of the binder or atmospheric moisture and without drying or clogging spray gun, etc., and, of course, eliminating possible human error in the preparation or admixture of various components at the point of use as with conventional such coating compositions. Also, it may be preferred to include in the compositions according to this invention a thixotropic additive agent for controlling both the initial consistency and the rheology of the coating composition as shipped or as used under the particular conditions of use, and the foregoing provides a coating composition into which can conveniently be incorporated an amount of metallic pigment to provide, not only corrosion resistance, but also cathodic protection and desired uniform electrical conductivity, notwithstanding premixing of the entire composition at the point of manufacture and storage of all the components as admixed for a substantial time thereafter without substantial diminution of the available metallic pigment content by chemical reactions within the coating material itself and prior to application thereof to a surface to be protected.

As will be understood by those skilled in this art, utilizing resins, as mentioned above, in the formation of a binder coating composition with conventional solvents, driers, thinners, etc., results in a composition including a number of acidic components or acidic radicals which would normally be expected to react chemically with a highly reactive material such as finely divided zinc added thereto. Quite apart from the difficulty which might be experienced in attempting to standardize the specifications of such material from the standpoint of variation in zinc-acidic reaction as a function of time in order to incorporate initially into the composition sufficient zinc pigment to maintain the desired minimal quantity thereof even after prolonged storage, it is apparent that substantial wastage of the added metallic zinc may be experienced, and this wastage may be a very significant economical factor in situations where the finely divided zinc content may represent a substantial or preponderant item of cost in the manufacture of the entire composition. Also, any such reactions which do not go to completion prior to packaging the compositions in a sealed container may produce gaseous reactants in the container providing a dangerous condition. Attempting to avoid this difficulty by providing the user of such a composition with separately packaged binder and metallic pigment component for admixture at the point of use, understandably also, interjects an undesired economic factor, as well as an element of human error in the ultimate mixing thereof, particularly when the final composition is to be used by, perhaps, relatively unskilled personnel.

According to this invention, however, the reaction of acidic or other reactive components in the binder composition preliminarily with a basic material for the utilization thereof, at least to a point of substantial nonreactivity with a finely divided zinc pigment, is accomplished without disruption or diminution of the film forming and binder properties of the various resinous components of the binder or vehicle. Particularly utilizing finely divided zinc material (preferably of an average particle size which is less than about 6 microns maximum) in such a medium, moisture inherently in the vehicle, or added thereto even merely from the atmosphere during storage or use, may also provide a source of reaction with such zinc pigment and to an extent where an appreciable part of the pigment may react in a manner which removes it from its desired utility or function in corrosion resistance, etc., as noted, with, as will be understood, even some hydrogen gas formation at the surface of the zinc particles, either before or after coating on to a surface to be protected, resulting in well understood loss of effectiveness of the zinc in the composition or the protective coating applied therefrom.

According to this invention, then, it is also preferred to incorporate into the resin binder or vehicle composition, preferably prior to adding the metallic pigment, a moisture-absorbing component such as a precipitated anhydrous silica gel for absorption therefrom of moisture (including any water which may be formed as a result of the neutralizing reaction between acidic components in the resin binder or vehicle and the added basic neutralizing component). Preferably, also, an additional or excess amount of such moisture-absorbent is added initially to maintain a substantial excess in the finished coating composition, even after adding the metallic pigment thereto, to absorb additional moisture which may be incorporated into the finished composition in use or in storage to maintain an essentially anhydrous or dehydrated condition in the composition to avoid later reaction with the zinc pigment between the time the finished and ready mixed paint is completed and the time it is finally applied to a surface to be protected.

Merely as illustrative of compositions embodying and for practising this invention may be noted the following examples, each of which was formulated by admixing the several resin binder and solvent and thinner and drier vehicle components, thereafter adding the basic hydroxide or alkaline oxide component for the neutralizing reaction, and then adding the moisture absorbing component with, if desired, a thixotropic additive agent for the adjustment of the final rheology, before adding the metallic pigment to form the finished and ready mixed product embodying and for practising this invention:

*Example I*

| | Percent |
|---|---|
| Phenolic modified alkyd 50% solution in xylol | 19.40 |
| Baker castor oil-MPA-40% vegetable oil in mineral spirits | 1.95 |
| Xylol | 18.84 |
| Alcoa aluminum paste 74% aluminum in mineral spirits | 2.65 |
| Cobalt naphthenate | .38 |
| Manganese naphthenate | .40 |
| Lithium oxide | .10 |
| Anhydrous silica gel powder form | .47 |
| Zinc dust average particle size 6 microns maximum | 55.81 |
| | 100.00 |

*Example II*

| | Percent |
|---|---|
| Epoxy ester resin 50% solution in xylol | 16.35 |
| Zinc stearate soap | 2.00 |
| Mineral spirits | 20.10 |
| Aluminum powder | 1.90 |
| Cobalt naphthenate | .25 |
| Manganese naphthenate | .25 |
| Anhydrous potassium hydroxide powder | .57 |
| Zinc dust average particle size 6 microns maximum | 58.58 |
| | 100.00 |

*Example III*

| | Percent |
|---|---|
| Glycerol phthalate linseed oil alkyd 50% in spirits | 18.00 |
| Baker Castor Oil Co. "Thixcin" 25% solution in xylol | 1.10 |
| Toluol | 16.00 |
| Alcoa aluminum paste 74% aluminum in mineral spirits | 2.70 |
| Lead naphthenate | .38 |
| Cobalt naphthenate | .20 |
| Zirconium drier | .20 |
| Anhydrous silica gel | .65 |
| Zinc dust | 60.77 |
| | 100.00 |

*Example IV*

| | Percent |
|---|---|
| High phenolic modified glycerol isophthalate 60% in xylol | 19.00 |
| Thixotropic agent | 1.50 |
| Xylol | 16.00 |
| Cobalt naphthenate | .25 |
| Zirconium drier | .25 |
| Powdered quick lime | .15 |
| Zinc—average particle size 6 micron maximum | 62.85 |
| | 100.00 |

In the foregoing illustrative examples, as will be understood, the several resin binder components (listed first in each example) are particularly selected as embodying the desired electrical properties (when dry) and other film-forming properties, notwithstanding the fact that such resin materials would be, normally or inherently, reactive with metallic zinc admixed therewith. The components such as castor oil, soap, "Thixcin," etc., are well known thixotropic agents or thickeners conventionally used in the production of various paints and liquid coating compositions, and the materials such as lead, cobalt, manganese, and zirconium naphthenates are conventional and well known driers for use in the manufacture of paints and other coating compositions. Although a component such as the aluminum paste or aluminum powder may have some effect regarding the mechanical aspects of protection by the coating, it is included for the purpose of providing proper consistency and coating and film characteristics in the finished coating, and is not believed to have any particular effect on the desired electrical and similar protective functions attributable to the metallic zinc pigment component of the coatings in accordance with this invention. Components such as silica gel and quick lime are, as will be understood, added for their moisture absorbing characteristics, and the entire composition is neutralized with anhydrous hydroxides or alkaline metal oxides at least to the point of non-reactivity with metallic zinc later admixed therewith as noted.

It is preferred to utilize, as the metallic pigment in coatings according to this invention, a very finely divided zinc dust, primarily for the purpose of having available in the dried coating an increased surface area of the zinc pigment composition for enhancing the cathodic or galvanic protective properties of the dried coating, which properties are believed to be, in part at least, a function of the surface area of the metallic coating particles affording the cathodic protection. By the same token, one might expect the reactivity of the zinc pigment with other components in the coating to increase as the particle size is decreased, and, as noted, it is desired to incorporate in the coating material to be applied as high a percentage as practicable of the metallic pigment on which the various protective functions are predicated with, as will be understood, as small an amount as practicable of undissolved or suspended inert or unreactive particles which might interrupt or detract from the desired electrical or other properties in the dried coating.

Accordingly, in addition to having the zinc dust pigment of very fine particle size for the desired purpose of enhancing the completeness and efficiency of cathodic protection, it is also preferred to have the purity of the zinc pigment as high as practicable for the purpose of incorporating a minimum of inert components with the zinc pigment. Considering as illustrative a dried zinc dust pigment analyzing, before incorporation into the coating, as having 98.8% total zinc content (as elemental zinc or oxides, etc., the remainder of the zinc dust being conventional impurities such as lead, copper, iron, cadmium, etc.), it is preferred that such pigment be purified to the point where there is about 97.1% thereof metallic or elemental zinc available for cathodic protection in the finished coating, and satisfactory results according to this invention are achieved with zinc dust pigment compositions containing at least 95% of the zinc content as elemental or metallic zinc available for the desired function here prior to mixing the other components. With such pigment compositions, according to this invention, it is desired to achieve in the finished liquid coating composition or paint a situation where virtually all of the metallic zinc available in the pigment component prior to mixing is available as a metallic or elemental zinc in the dried coating, and, to this end, the various acid or reactive components of the vehicle and binder are neutralized and moisture absorbed therefrom to avoid reaction in shipment or storage or upon mixing of components in the binder or vehicles with the available metallic zinc pigment, which reactions might use up or remove some of the available elemental pigment from its metallic, cathodic protection, and/or electrical conducting function in the dried coating.

As further illustrative of the advantages of coating compositions or paints embodying this invention, it may be noted that the various resin binders chosen appear to have a substantial inhibiting effect upon decomposition of the dried coating with heat as during welding so that the conventional formation of zinc oxide at the point of welding with other types of zinc coatings is minimized to a point where the welding of metallic parts coated with compositions embodying this invention is permissible within the health standards and regulations of both labor unions and insurance companies. Also the decomposition of the coating at the point of welding (particularly with spot welding) is reduced to minimize a build-up of decomposed zinc on the welding electrodes, with both these advantages believed to stem primarily from the presence of the non-conductive binder component or film forming resin holding and surrounding and, perhaps, protecting the discrete zinc particles from welding heat and/or decomposition. Similarly, coatings according to this invention combine the substantially inconsistent properties of including an electrically non-conductive resin binder (for maintaining the metallic zinc particles in a dielectric atmosphere and insulated from the structure to be protected for forming, essentially, a discrete electrode to achieve the desired cathodic or galvanic protection of the surface on which the coating is applied) which binder also lacks chemical reactivity with the zinc, it being understood that such non-conductivity of the binder component in the coating is desired when the coating is dried, yet, somewhat inconsistently, electrical conductivity among the zinc particles or through the zinc portion of the coating is desired for weldability, etc., all by contrast with other types of so-called "weldable" coatings which are conductive by virtue of the binders therein only when the coating is wet and while any metallic pigment therein is suspended in a discontinuous undissolved phase.

Accordingly, as will be noted from the foregoing, metallically pigmented protective coatings or paints are provided according to this invention to give, when applied and dried on a metallic surface to be protected, both mechanical and galvanic protection as well as corrosion resistance and electrical conductivity, and such pigmented coatings are provided with a minimum blending or mixing exposed to the atmosphere, and in a manner whereby all components of the liquid composition may be admixed at the point of manufacture and packaged in sealed cans or containers for immediate shipment and prolonged storage without reactions occurring therein which either produce in the container an undesired gas or other resultants of chemical reaction or use up or dissipate an appreciable portion of the added metallic pigment or end up in a condition where an appreciable amount of inert or unproductive salts or other useless undissolved materials or components are applied to the surface to be protected.

While the processes and products herein described constitute preferred embodiments of the invention, it is to be understood that the invention is not limited to these precise processes and products, and that changes may be made therein without departing from the scope of the invention which is defined in the appended claims.

What is claimed is:

1. In a method for the preparation of a ready mixed metallic pigmented zinc base paint composition for application to a metallic surface for providing a weldable, corrosion resistant and cathodic protective dried coating thereover, the steps which comprise mixing a liquid vehicle including a resinous film forming binder selected from the group consisting of phenolic, epoxy, alkyd, polystyrene, and chlorinated rubber binders, said liquid vehicle including components selected from the group consisting of acids and water capable of reacting with metallic zinc to form a reaction product, adding to said vehicle a neutralizer selected from the group consisting of potassium hydroxide, sodium hydroxide, and basic metal oxides for reaction with said acids, adding to said vehicle a desiccant selected from the group consisting of silica gel and quick lime, and thereafter adding to the thus prepared vehicle a substantial portion of finely divided metallic zinc for forming with said vehicle said ready mixed zinc base paint composition in which said finely divided zinc is substantially free of zinc oxide and zinc salt reaction products with said reactive components.

2. The method as set forth in claim 19 in which said metallic zinc includes at least about 95% of elemental zinc.

3. In a method for the preparation of a ready mixed metallic pigmented zinc base paint composition for application to a metallic surface for providing a weldable, corrosion resistant and cathodic protective coating thereover, the steps which comprise mixing a liquid vehicle including a synthetic film forming and binder component and solvents and thinners and driers therefor, said binder component selected from the group consisting of phenolic, epoxy, alkyd, polystyrene, and chlorinated rubber binders, said liquid vehicle including components selected from the group consisting of acids and water capable of reacting with metallic zinc to form a reaction product, adding to said vehicle a neutralizing reactant selected from the group consisting of potassium hydroxide, sodium hydroxide, and basic metal oxides for reaction with said acids to exhaust and neutralize said acids, thereafter adding to said thus treated vehicle a desiccant component selected from the group consisting of silica gel and quick lime for adsorption of moisture therein susceptible to reaction with a metallic zinc pigment added thereto, and thereafter adding to said thus prepared composition a substantial proportion of finely divided metallic zinc for forming with said vehicle said ready mixed base paint composition in which said finely divided metallic zinc is substantially free of zinc oxide and zinc salt reaction products with said reactive components.

References Cited in the file of this patent

UNITED STATES PATENTS

| | | |
|---|---|---|
| 2,044,292 | Grady | June 16, 1936 |
| 2,234,164 | Harris | Mar. 11, 1941 |
| 2,568,188 | Fisher | Sept. 18, 1951 |
| 2,881,145 | Schmutzler | Apr. 7, 1959 |
| 2,904,525 | Babcock | Sept. 15, 1959 |
| 2,933,400 | Wurbs et al. | Apr. 19, 1960 |

UNITED STATES PATENT OFFICE
CERTIFICATE OF CORRECTION

Patent No. 3,110,691                  November 12, 1963

John R. Fisher, Jr.

It is hereby certified that error appears in the above numbered patent requiring correction and that the said Letters Patent should read as corrected below.

Column 1, line 61, for "proclude" read -- preclude --; column 7, line 1, after "components" insert a comma; column 8, line 52, for "usefless" read -- useless --; column 9, line 7, for the claim reference numeral "19" read -- 1 --.

Signed and sealed this 19th day of May 1964.

(SEAL)
Attest:
ERNEST W. SWIDER

Attesting Officer

EDWARD J. BRENNER
Commissioner of Patents